Jan. 25, 1949.   C. W. G. LACEY ET AL   2,460,092
BORING HEAD FOR MACHINE TOOLS
Filed April 26, 1946   3 Sheets-Sheet 1

Inventors:
C. W. G. Lacey
and
G. L. Binns
By: Watson, Cole, Grindle & Watson
ATTYS.

Jan. 25, 1949. C. W. G. LACEY ET AL 2,460,092
BORING HEAD FOR MACHINE TOOLS
Filed April 26, 1946 3 Sheets-Sheet 2

Inventors:
C. W. G. Lacey
and
G. L. Binns
By: Watson, Cole, Grindle & Watson
Attys.

Jan. 25, 1949. C. W. G. LACEY ET AL 2,460,092
BORING HEAD FOR MACHINE TOOLS
Filed April 26, 1946 3 Sheets-Sheet 3
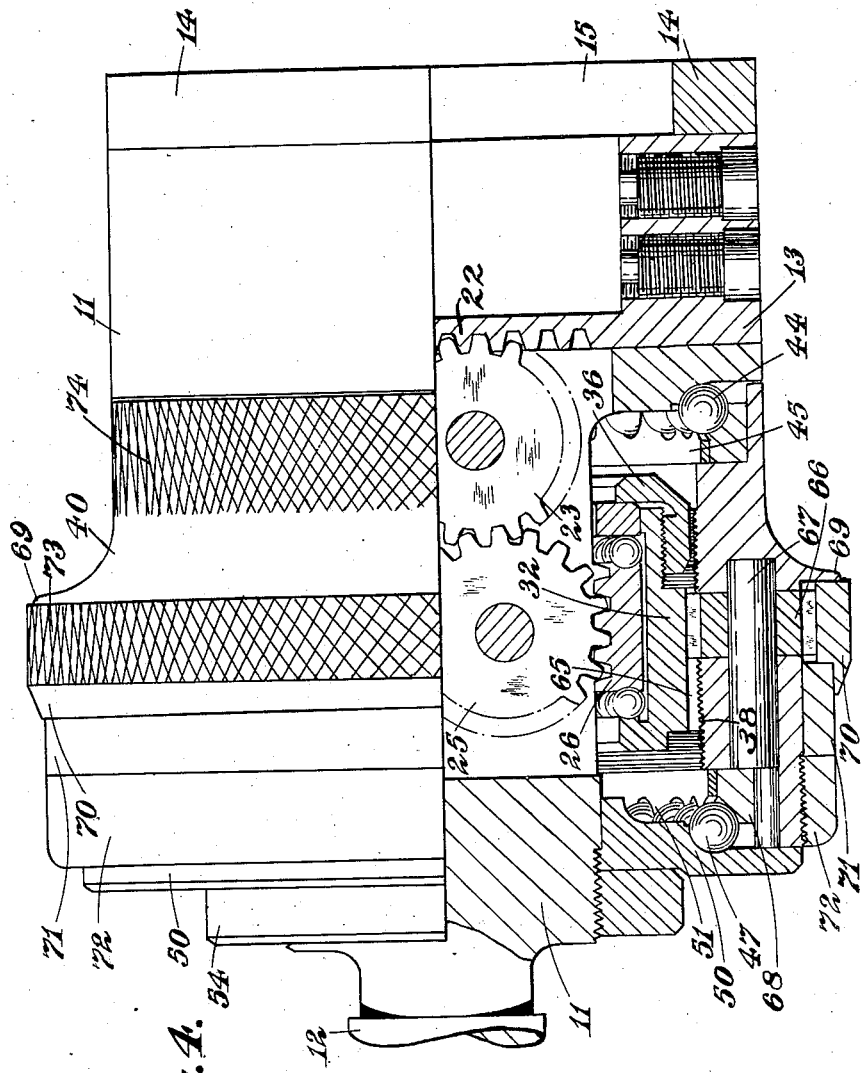
Inventors:
C. W. G. Lacey
and
J. L. Binns
By: Watson, Cole, Grindle & Watson
Attys.

Patented Jan. 25, 1949

2,460,092

UNITED STATES PATENT OFFICE 2,460,092

BORING HEAD FOR MACHINE TOOLS

Charles William George Lacey and Geoffrey Laird Binns, Slough, England, assignors to Optical Measuring Tools Limited, Slough, England, a British company Application April 26, 1946, Serial No. 665,252
In Great Britain January 3, 1945

Section 1, Public Law 690, August 8, 1946
Patent expires January 3, 1965

6 Claims. (Cl. 77—58)

1

This invention comprises improvements in or relating to boring heads for machine tools.

Boring heads are known for fixing on a rotating spindle in which a tool is carried on a cross slide and the cross slide is geared to a longitudinally movable collar on the head, which collar rotates with the head and is connected through appropriate thrust means to a non-rotating member, or a member which can be held from rotation and which is provided with means to adjust it lengthwise relatively to the head so that the radius of the tool can be adjusted while the head is rotating and the present invention relates to a boring head of this type.

In such heads as heretofore constructed the diameter of the head in relation to the scope of movement of the boring tool is considerable on account of the amount of radial space taken up by the parts which are provided for longitudinal adjustment of the collar. It will be appreciated that the collar, so that it may not exert an undue amount of drag upon the non-rotating parts, is normally connected to these parts by a double ball-thrust race. Outside the thrust race is a non-rotatable adjustment-ring which is engaged by the thrust race with the collar, outside the ring is a casing relatively to which the ring is made adjustable longitudinally, being mounted on guide bars or their equivalent carried by the casing, and mounted on the casing is an adjustment sleeve, again outside the ring, the sleeve having screwthreaded engagement with the ring so that if the sleeve is moved relatively to the casing the ring, and with it the collar, can be moved longitudinally. The radial space taken up by these parts makes the head bulky and heavy in relation to the work which it is called upon to do.

According to the present invention the said sleeve on the casing is dispensed with, the adjustment-ring is made rotatable relatively to the casing and has screwthreaded engagement therewith and rotation of the ring relatively to the casing is effected by gear teeth cut on the ring and operated by a geared member carried by the casing.

The invention therefore comprises in a boring head of the type described the provision of adjusting means for the collar consisting of an adjustment-ring and a casing surrounding the adjustment-ring, both the ring and the casing being mounted so as to be rotatable concentrically with and relatively to the head, the adjustment-ring having a screwthreaded connection with the casing so as to be moved endwise by rotation relatively thereto and also having gear teeth operated by a gear member carried by the casing, to bring about said rotation relatively to the casing.

Preferably the gear teeth on the ring and the screwthread thereon are cut so as to intersect one another with the object of affording a more compact arrangement.

In one form of the device the gear teeth on the adjustment-ring consist of worm teeth and the gear member on the casing consists of a worm. In another form the gear teeth on the adjustment-ring consist of spur gearing and the gear member on the casing consists of a pinion, or pinions, meshing therewith. In this latter case an internally toothed gear ring mounted on the casing may surround and mesh with the pinion gearing for operating the same.

The following is a description by way of example of constructions in accordance with the present invention, reference being made to the accompanying drawings, in which:

Figure 4 is a half elevation and half longitudinal section of a second form of boring head in accordance with the invention.

Figure 1:
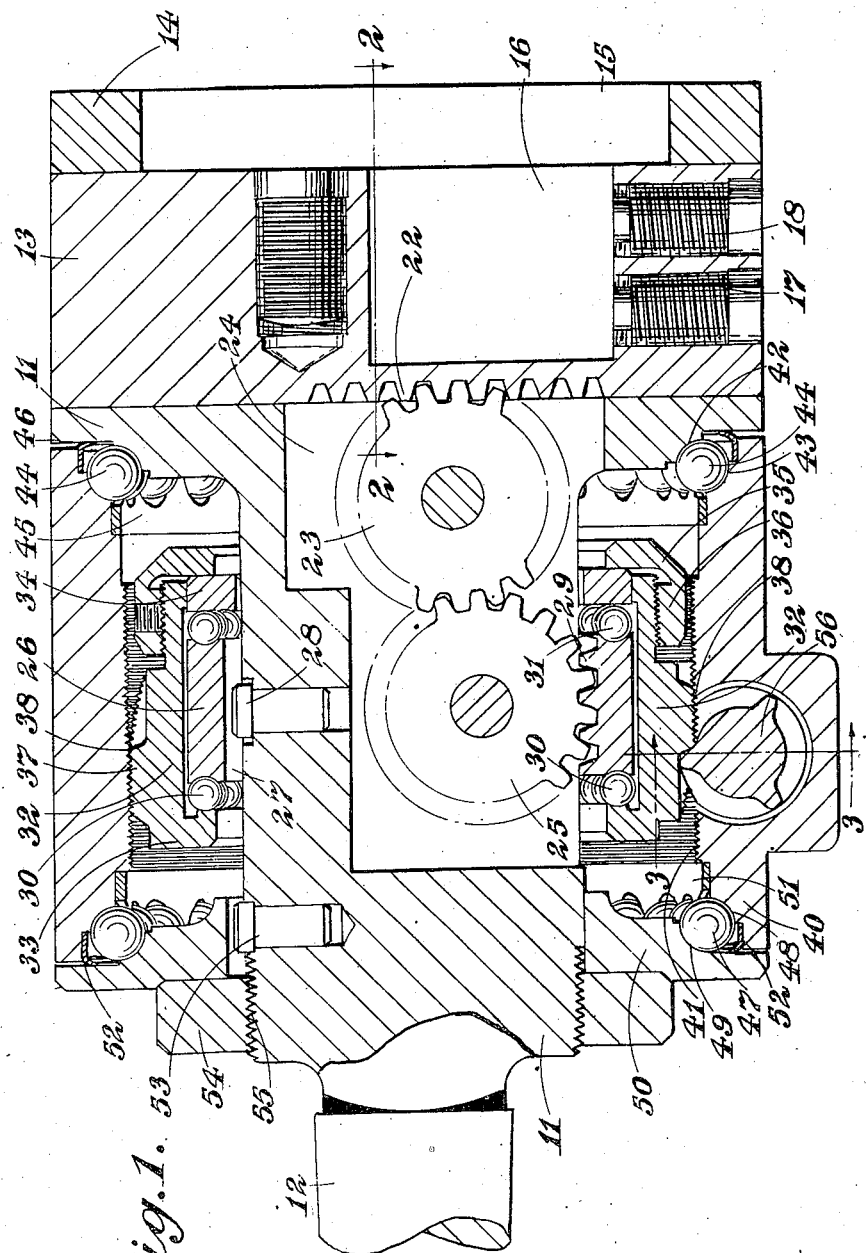
Figure 1 is a longitudinal section through a boring head in accordance with the invention.
Figure 2:
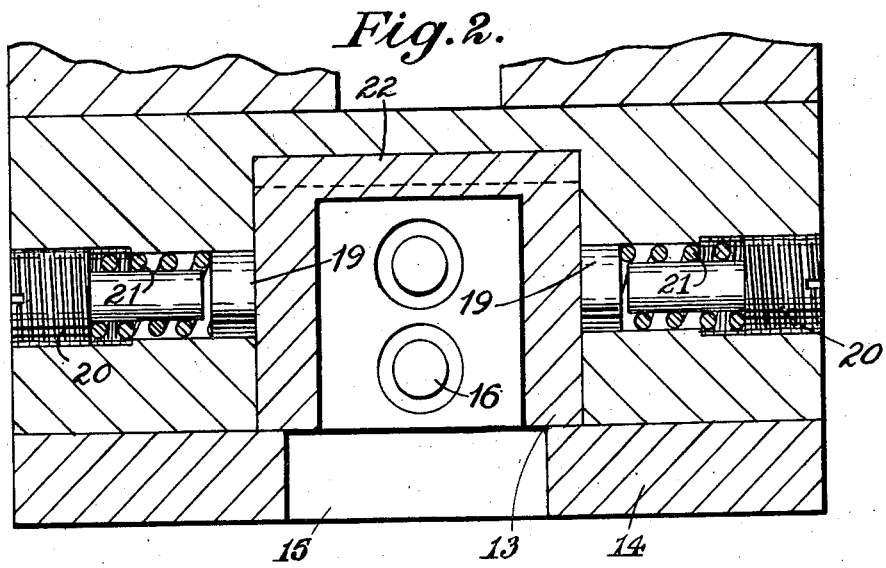
Figure 2 is a cross section of a part of the head upon the line 2—2 of Figure 1 looking in the direction of the arrows.
Figure 3:
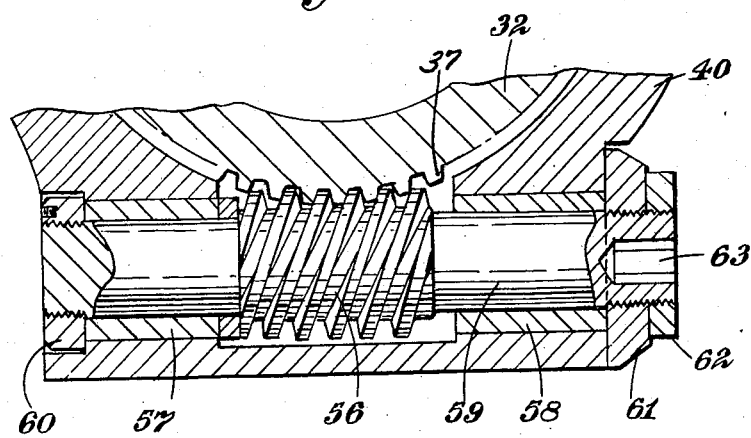
Figure 3 is a cross-section upon the line 3—3 of Figure 1, looking in the direction of the arrows.

Referring to Figures 1 to 3, the main body of the boring head consists of a member 11 having a tapered shank 12. The member 11 is cylindrical along the portion which adjoins the shank 12 and is somewhat enlarged (and also circular as viewed in end elevation) at the end portion remote from the shank 12 so as to receive a cross slide 13 to carry the boring tool. The cross slide 13 is held in place in a slot which is cut across the end of the body 11 by means of a cover plate 14 which has a central slot 15 through it. The cross slide 13 has a recess 16 to receive the tool and the tool is secured in the recess by means of clamping screws 17, 18 which are hardened and are of the type having recessed polygonal openings in their heads to receive a driving tool for tightening them. The tool projects from the cross slide through the slot 15 and has a cutting edge which can be of any desired shape. As seen in the cross-section, Figure 2, pads 19 bear on the sides of the cross slide 13 and the slide can be locked by grub screws 20 which lie behind the pads and can be screwed up to force the pads against the cross slide. When the grub screws are slacked off the pads are held friction-tight against the cross slide by means of springs 21.

The cross slide 13 which carries the tool has rack teeth 22 cut on its back which engage a pinion 23 in a slot 24 in the body portion 11 of the head. The pinion 23 engages a second pinion 25 in the same slot, the teeth of the pinion 25 projecting at one side beyond the exterior of the cylindrical portion of the body 11. An adjusting collar 26 surrounds the cylindrical portion and has a close sliding fit thereon. The collar has an internal keyway 27 which engages a key 28 on the head and diametrically opposite to the keyway the interior of the collar has rack teeth 29 which mesh with the pinion 25. Thus longitudinal movement of the collar 26 will produce cross movement of the slide 13 and the tool carried thereby. The collar 26 is hollowed around its two ends so as to constitute a double ball thrust race member and engages balls 30, 31. Closely surrounding the collar is an adjustment ring 32 having an internal flange 33 at one end which bears on the race of balls 30. It engages an internal sliding ball race member 34 at the other end which bears on the race of balls 31. The ball race member 34 is backed up by an internally projecting flange 35 on an adjusting nut 36 which is screwed on the exterior of the ring 32 and thus serves to press the ball race member 34 towards the balls 31 and can be adjusted so as to take up all slack and ensure that longitudinal movement of the adjustment member 32 will produce an exactly equal longitudinal movement of the collar 26 although the adjustment ring 32 does not need to partake of rotary movement with the collar. It will be appreciated that the collar 26 being keyed to the body 11 partakes of any rotary movement imparted to the boring head by the shank 12.

The exterior of the adjustment ring 32 is cut with a series of worm gear teeth 37 which extend around its whole periphery. The tips of the worm gear teeth 37 are cut with a screwthread 38, so that the thread 38 intersects the worm gear teeth.

Concentric with the adjustment ring 32 is a casing 40 which is internally screwthreaded as shown at 41 to fit the screwthread 38 on the adjustment ring 32. The casing 40 is supported from the body 11 by a ball race beyond the screwthread which is formed in the body 11 at 42 immediately behind the cross slide 13. A race-way 43 is formed on the casing to correspond and balls 44 are interposed. The balls 44 are held apart by a cage member 45 and entry of dirt at the joint between the casing 40 and the body 11 is prevented by a flexible leather or other moulded ring 46 which is fitted into the body 40 and has a flap to bear against the body 11.

There is a second ball race at the other end of the casing 40 which is constituted by balls 47, race-ways 48 on the casing and 49 on a race member 50, a cage 51 and a dust-excluding flap 52. The race member 50 has a sliding fit on the cylindrical portion of the body 11, is prevented from rotation relatively thereto by a key 53 and is backed up by a nut 54 which works on a screwthread 55 on the body 11 close to the shank 12. Adjustment of the nut 54 serves to take up all slack on the ball races and ensures that rotation of the casing 40 relatively to the adjustment ring 32 will produce an exactly equivalent movement of the adjustment ring without any backlash.

The requisite relative movement between the ring 32 and the casing 40 is provided by a worm 56 mounted in bearings 57, 58 (see Figure 3) in the casing 40 so that it meshes with the worm gear teeth 37 cut in the adjustment ring 32. It is found that owing to the compactness which results from the arrangement described, and especially from the screwthread 38 and the gear teeth 37 being cut so as to intersect one another, and from the absence of any provision for sliding movement longitudinally between the ring 32 and the casing 40, the boring head can be made remarkably small in relation to its capacity. Although the overall diameter of the body 11 at the portion which carries the cross slide 13 in the design shown in the drawing may be made as little as 2½ inches, this is sufficient for boring holes up to 4 inches in diameter. The worm 56 has a spindle 59 which extends through the bearings 57, 58 and is screwed tightly into a head 60 at one end. At the other end it carries a thrust washer 61 which is held in any desired position of adjustment by a lock-nut 62. The end of the spindle has a polygonal recess 63 so that it can be operated by inserting a key in the recess.

Such a construction as that described gives an extremely fine adjustment for the boring tool, which is desirable where fine settings to particular diameters are called for but might be objectionable if the tool were being used for facing a boss. As an alternative therefore which provides a more rapid movement of the tool the construction illustrated in Figure 4 may be adopted. Here most of the parts are similar to those already described in connection with Figures 1 to 3 and are similarly numbered in the drawing but instead of engaging the adjustment ring 32 with a worm the gear teeth on the periphery of the adjustment ring 32 consists as of spur gear teeth 65 which intersect the screwthread 38. The spur gear teeth 65 are engaged by a pinion 66 which runs on a pin 67 fixed in the casing 40 parallel with the axis of the head. To allow the pin 67 to be inserted the casing 40 is formed with a separate race member 68 to engage the balls 47, the race member 68 having a sliding fit in the end portion of the casing 40 and capable of being removed so that it can be inserted in the casing after the pin 67 has been assembled therewith. The casing has an enlarged flange 69 which supports an internally toothed gear ring 70, the teeth of which mesh with the pinion 66. The gear ring 70 is further supported by a ring 71 which has a sliding fit on the exterior of the casing 40 and is pushed up toward the gear ring 70 by means of an internally screwthreaded sleeve 71 threaded on the exterior of the end of the casing 40. The gear ring 70 is knurled externally, as indicated in Figure 4, at 73 to afford a handgrip to the operator and the casing 40 may itself be knurled as shown at 74. The operator therefore can hold the casing 40 from rotation by gripping the knurling 74 and can then adjust the boring teeth of the cross slide 13 to alter the radius of its operation by rotating the gear ring 73, thus rotating the pinion 66 and the adjustment ring 32. A graded scale can be placed in the portion of the gear ring 70 which abuts against the ring 71, if desired, to show the position of adjustment reached. This method of adjustment is more rapid than that with the worm gear of Figure 1 but nevertheless gives great exactitude. It will be appreciated that the gears 23, 25 and the rack teeth 22 and 26 need to be formed fully so that they mesh without any backlash but this can readily be accomplished with modern gears.

It will be noted that the casing 40 is mounted on the head by ball races 44, 47 which are located one on each side of the screwthreaded portion 41 of the casing so that the adjustment ring 32 works between them, an arrangement which affords good support to all the parts.

We claim:

1. In a boring head the combination of a body, a tool-carrying cross slide thereon, a longitudinally movable collar on the body, gearing connecting the cross slide with the longitudinally movable collar, an adjustment ring concentric with and rotatable relatively to the collar but connected thereto so as to move longitudinally therewith, a casing surrounding the adjustment ring and rotatably mounted relatively to the said body, a screw-threaded connection between the adjustment ring and the casing to cause the adjustment ring to be movable longitudinally relatively to the casing when rotated relatively thereto, a gear member carried by the casing and gear teeth on the adjustment ring, said gear teeth meshing with said gear member.

2. In a boring head the combination of a body, a tool-carrying cross slide thereon, a longitudinally movable collar on the body, gearing connecting the cross slide with the longitudinally movable collar, an adjustment ring concentric with and rotatable relatively to the collar but connected thereto so as to move longitudinally therewith, a unitary casing member surrounding the adjustment ring and rotatably mounted relatively to the said body, a screw-threaded connection between the adjustment ring and the casing member to cause the adjustment ring to be movable longitudinally relatively to the casing member when rotated relatively thereto, a gear member carried by the casing member and gear teeth on the adjustment ring which intersect the screw-thread thereon, said gear teeth meshing with said gear member.

3. A boring head as claimed in claim 2, wherein the gear teeth on the adjustment ring consist of worm teeth and the gear member on the casing member consists of a worm.

4. A boring head as claimed in claim 2, wherein the gear teeth on the adjustment ring consist of spur gearing and the gear member on the casing member consists of one or more pinions meshing therewith.

5. A boring head as claimed in claim 2, wherein an internally toothed gear ring is mounted on the casing member concentrically with the adjustment ring and the gear member on the casing consists of one or more pinions meshing on the one hand with the gear teeth on the adjustment ring and on the other hand with the internally toothed gear ring.

6. A boring head as claimed in claim 2, wherein the adjustment ring is connected to the collar at one end by an internally projecting flange and ball-bearings between the flange and the collar and at the other end by ball-bearings and a ball race-member within the ring which race-member is longitudinally adjustable relatively to the adjustment ring.

CHARLES WILLIAM GEORGE LACEY.
GEOFFREY LAIRD BINNS.

REFERENCES CITED

The following references are of record in the file of this patent:

UNITED STATES PATENTS

| Number | Name | Date |
|---|---|---|
| 1,962,951 | Conwell | June 12, 1934 |